United States Patent [19]

Beer et al.

[11] 4,353,196

[45] Oct. 12, 1982

[54] PACKAGE AND AUTOMATIC METHOD OF FORMING SAME

[76] Inventors: Frederick W. Beer, 270 Timberbank Blvd., Unit 55, Agincourt, Ontario, Canada, M1W 2M1; Robert A. Davis, 24 Eva Rd., Apt. 1605, Etobicoke, Ontario, Canada; Fedor P. Kresak, 31-12 Sentinel Rd., Downsview, Ontario, Canada; Conio C. Kuev, 620 Lolita Gardens, Apt. 1909, Mississauga, Canada, L5A 3K7

[21] Appl. No.: 144,986

[22] Filed: Apr. 30, 1980

Related U.S. Application Data

[63] Continuation-in-part of Ser. No. 945,619, Sep. 25, 1978, abandoned.

[30] Foreign Application Priority Data

Sep. 12, 1978 [CA] Canada .................................. 311143

[51] Int. Cl.³ ............................................... B65B 9/06
[52] U.S. Cl. .......................................... 53/451; 53/51; 53/552
[58] Field of Search ..................... 53/51, 58, 451, 551, 53/552, 568

[56] References Cited

U.S. PATENT DOCUMENTS

| | | | |
|---|---|---|---|
| 1,455,383 | 5/1923 | Bates | 53/451 |
| 2,385,897 | 10/1945 | Waters | 53/413 |
| 2,869,298 | 1/1959 | Zwoyer | 53/51 |
| 2,931,149 | 4/1960 | Mitchell | 53/552 |
| 2,969,627 | 1/1961 | Leasure | 53/451 |
| 3,045,403 | 7/1962 | Mitchell | 53/552 |
| 3,061,989 | 11/1962 | Newell | 53/552 |
| 3,238,692 | 3/1966 | Montouri | 53/552 X |
| 3,503,175 | 3/1970 | Marasso | 53/553 X |

FOREIGN PATENT DOCUMENTS

2050991 1/1981 United Kingdom ................. 53/552

*Primary Examiner*—John Sipos
*Attorney, Agent, or Firm*—Murray and Whisenhunt

[57] ABSTRACT

This invention relates to a method of automatically forming packages of materials or goods such as milk packages from flexible film and to the novel packages produced thereby. The roll stock film is passed over a forming shoulder to give it a tubular shape and the opposite edges are joined by a sealing bar to form a tubular portion. The milk pouches or other material to be packaged are then dropped into the tubular portion which has previously been laterally sealed across the bottom. The weight of the pouches draws the film down between a pair of reciprocating cutting and sealing jaws when they are opened until the pouches come to rest upon a pivotal support member. The jaws are then closed to form two lateral seals, i.e. one for that package and one for the next package, and a lateral cut separates the packages. The package thus formed may also have an upper handle portion.

8 Claims, 10 Drawing Figures

PACKAGE AND AUTOMATIC METHOD OF FORMING SAME

This is a continuation-in-part of co-pending application Ser. No. 945,619, filed on Sept. 25, 1978 now abandoned.

BACKGROUND OF THE INVENTION

This invention relates generally to automatic material packaging and more particularly to a novel method of packaging a predetermined quantity of material in flexible film and to the package resulting therefrom having a one piece structure providing a material enclosure and a handle portion.

In the past, it has been well known to manufacture flexible bags and then at a later stage to fill them with the desired materials or goods. This method or system has the disadvantage of being inefficient in that the two steps of manufacturing the bags and then filling them are separate and therefore necessarily involve the problems of packaging, transporting and opening the bags between the two stages. Furthermore, difficulties have been encountered with sealing the filled bags and also with economically providing suitable carrying means.

More recently, it has been attempted to overcome some of these disadvantages by using form fill methods of packaging a variety of products. However, these have still been found to have the disadvantages of having to utilize unsatisfactory methods and relatively costly film to provide packages of sufficient strength with satisfactory carrying means.

In the present invention, the disadvantages of separate bag manufacturing and filling operations have been avoided and at the same time has been found possible to significantly reduce film costs in providing a package with reduced malfunctions in the packaging operation as well as in the resulting package.

SUMMARY OF THE INVENTION

Accordingly, it is an object of the present invention to at least partially overcome the disadvantages of the prior art by providing an improved method of automatically packaging predetermined quantities of material in flexible film to form packages having one piece construction and providing a material enclosure and a handle portion.

In one of the aspects of the invention there is provided a method of forming packages of predetermined quantity of material from continuous roll stock flexible film comprising the steps of passing the film over forming means and joining the opposite edges of a first portion of the film along a substantially vertical seal line to form a first tubular portion, sealing opposite sides of said first tubular portion together along a lower lateral seal line, depositing said quantity of material into said first tubular portion from above the forming means, and joining said opposite sides of said first tubular portion along an intermediate lateral seal line above said material to form a material enclosure portion between the lower seal line and the intermediate seal line.

As a subsidiary aspect, opposite sides of said first tubular portion are joined along an upper lateral seal line across a central portion of the tubular portion, the upper lateral seal line being spaced from said intermediate seal line to form a handle portion therebetween, the handle portion having finger access around the upper lateral seal line, and laterally cutting the film above the upper seal line.

In another aspect of the invention, there is provided a method for automatically repeatedly packaging material in a flexible film package made from a continuous stock of film. The package has a substantially vertical heat seal joining the edges of the film into a tubular portion, a lower heat seal, an upper heat seal and the material is disposed in the so sealed package. The method comprises, as a first step, advancing the film downwardly to form a tubular configuration thereof over a forming means, heat sealing opposite edges of the film along the substantially vertical seal line to form a sealed tubular portion thereof, and closing sealing jaws transversely to engage thereinbetween the tubular portion disposed downwardly of the forming means. Thereafter, opposite sides of the tubular portion are heat sealed by sealing means disposed with said jaws to form said lower lateral seal line in said tubular portion and said upper lateral seal line in a previously filled package located below said jaws and supported by support member disposed downwardly from said jaws. After sealing, the so sealed tubular portion is laterally cut between the upper and lower seal lines to separate the said filled package from the said tubular portion. Additional material is then deposited in the tubular portion disposed upwardly of the said jaws, while the jaws are closed, whereby the material is supported above and by the said closed jaws. The jaws are then cooperatively opened to release the tubular portion disposed upwardly of the jaws and the support member is opened to allow the filled package resting upon the support member to fall therefrom, whereby the weight of the material alone disposed in the tubular portion above the jaws advances the tubular portion by gravity through the opened jaws and whereby the said first step is automatically repeated. The support member is thereafter closed, whereby the material in the tubular portion which had previously passed through the said opened jaws comes to rest upon the closed support member and the advance of the tubular portion is stopped, and whereby the correct length of tubular portion for forming a package is automatically measured by the distance of the support member from the jaws. The steps of the process are then repeated for repeatedly packaging of material, provided that the heat sealing step, the lateral cutting step, and the depositing of the material may be practiced in any order.

In yet a further aspect of the invention, in the foregoing method, the film used in the process has spaced apart printing and register indicia thereon, which indicia are sensible by an indicia sensing means, the film is passed near the indicia sensing means and the indicia causes the indicia sensing means to actuate and close a brake member on the advancing film, whereby the advancing film is stopped and the said sealing takes place between the said printing on the film. In yet a further modification of the foregoing method, a material sensing means, sensitive to the material to be packaged, is disposed in the path of the material at a position prior to its being deposited into said tubular portion. The material is passed near the said material sensing means and the material sensing means, after a time delay, actuates the opening of the said jaws and a repeat of the steps of the process.

In yet another embodiment, the two foregoing aspects, i.e. the use of an indicia sensing means and the use of a material sensing means may be practiced together in the same operation of the method.

The invention also provides an apparatus for automatically repeatedly packaging material in a flexible film package made from a continuous stock of film. The package has a substantially vertical heat seal joining the edges of the film into a tubular portion, a lower lateral heat seal, an upper lateral heat seal and the material is deposited in the so sealed package. The apparatus comprises a forming means for forming a tubular configuration of the film as the film is advanced thereover and vertical heat sealing means disposed downwardly from the forming means for heat sealing opposite edges of the tubular configured film along a substantially vertical seal line to form a sealed tubular portion thereof. Transverse sealing jaws are disposed downwardly from the vertical heat sealing means for engaging therebetween the sealed tubular portion disposed downwardly of the forming means. Lateral heat sealing means are disposed with said jaws for heat sealing opposite sides of the tubular portion to form said lower lateral seal line in said tubular portion and said upper lateral seal line in a previously filled package located below the jaws. A support member is disposed downwardly from said jaws for supporting said previously filled package. Lateral cutting means are provided for laterally cutting the sealed tubular portion between the upper and lower seal lines to separate the said filled package from said tubular portion. Depositing means are provided for depositing said material into the tubular portion disposed upwardly of the jaws, while the said jaws are in the closed position, whereby the deposited material is supported above and by said closed jaws. Operating means cooperatively open the jaws to release the tubular portion disposed upwardly of the jaws and for opening the support member to allow the filled package resting upon the support member to fall therefrom, whereby the weight of the material alone disposed in the tubular portion above the jaws is capable of advancing the tubular portion by gravity through the opened jaws and the function of the forming means is automatically repeated. The said operating means also closes the support member so that the material and the tubular portion that passed through the open jaws may come to rest upon the closed support member and the advance of the tubular portion is capable of being stopped, whereby the correct length of tubular portion for forming a package is automatically measured by the distance of the support member from the jaws. Finally, a repetitive operating means repeats all of the said functions of the apparatus, provided that the functions of the lateral heat sealing means, the lateral cutting means, and the depositing means may be performed in any order.

In a further embodiment of the apparatus, the film to be used by the apparatus has spaced apart printing and register indicia thereon, an indicia sensing means is disposed priorly to said forming means, a brake member is cooperatively disposed near said film and brake operating means are provided so that said indicia sensing means is actuated by said indicia to operate and close said brake member on the advancing film, whereby the advancing film is capable of being stopped and said sealing function may take place between said printing on said film.

As yet a further embodiment of the apparatus, a material sensing means is disposed in the path of the said material (as it is being deposited in said tubular portion) and jaws actuating means, responsive to said material sensing means, are provided for sensing the said material being deposited in the tubular portion and for opening the said jaws, after a time delay, and for causing a repeat of the functions of the forming means, the vertical heat sealing means, the transverse sealing means, the lateral sealing means, the lateral cutting means and the depositing means.

In addition, the two foregoing embodiments, i.e. the use of the indicia sensing means and the material sensing means may be combined in a single apparatus.

In another of its aspects, the invention provides a one piece material package formed of flexible film to have a lower material enclosure portion and an upper handle portion, opposite edges of the film being joined along a substantially vertical seal line to provide front and back sides which are joined along a lower lateral seal line, an intermediate lateral seal line and an upper lateral seal line, all said seal lines extending in a common plane, the enclosure portion being defined between the lower and the intermediate lateral seal lines, the handle portion being defined between the intermediate and the upper lateral seal lines, the upper lateral seal line extending across only a central portion of the package, thereby providing finger access to the handle portion around the upper lateral seal line.

Further objects and advantages of the invention will appear from the following description taken together with the accompanying drawings.

DETAILED DESCRIPTION OF THE DRAWINGS

Figure 1:
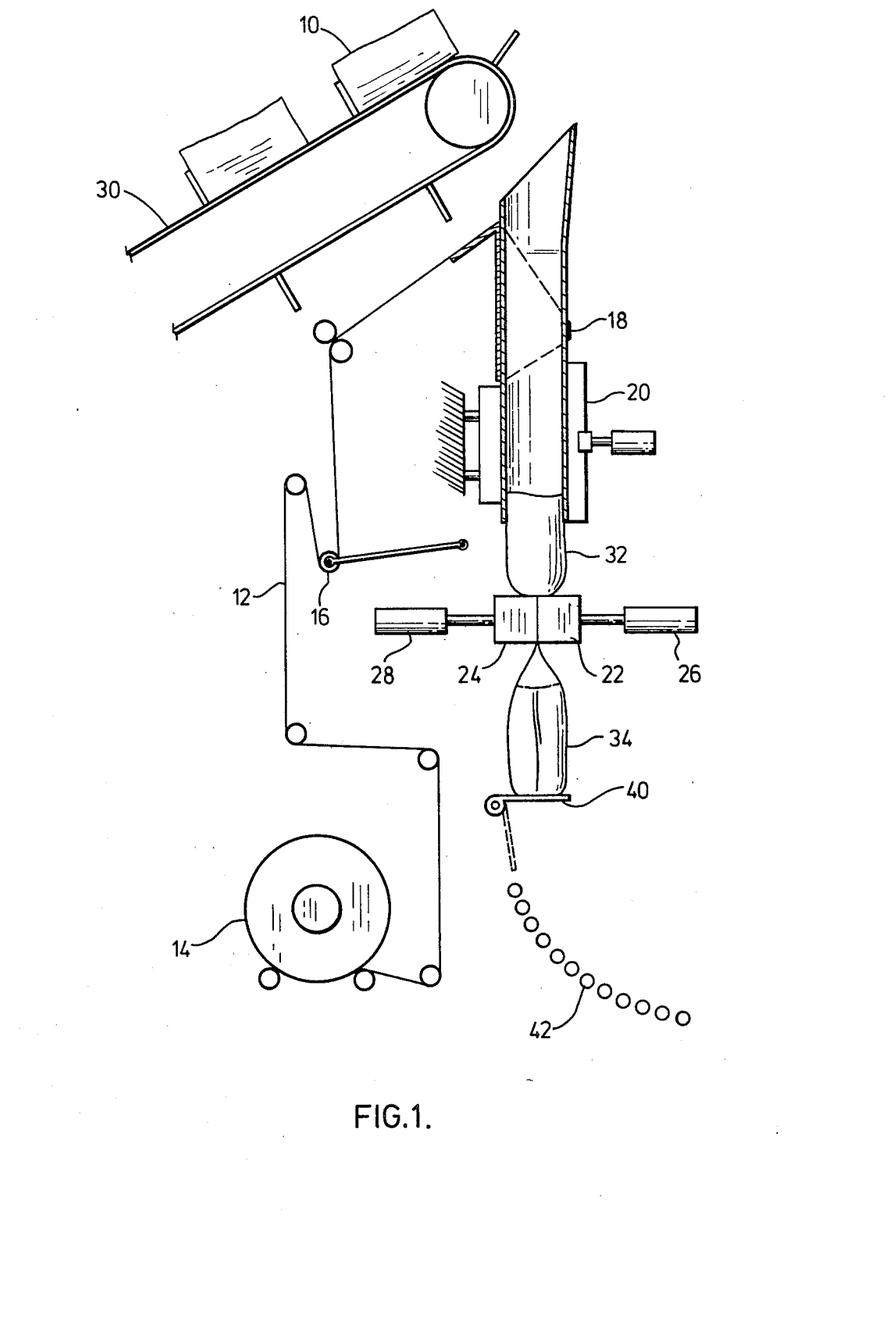
FIG. 1 is a schematic view of a packaging system to carry out the method according to a preferred embodiment of the invention.
Figure 2:
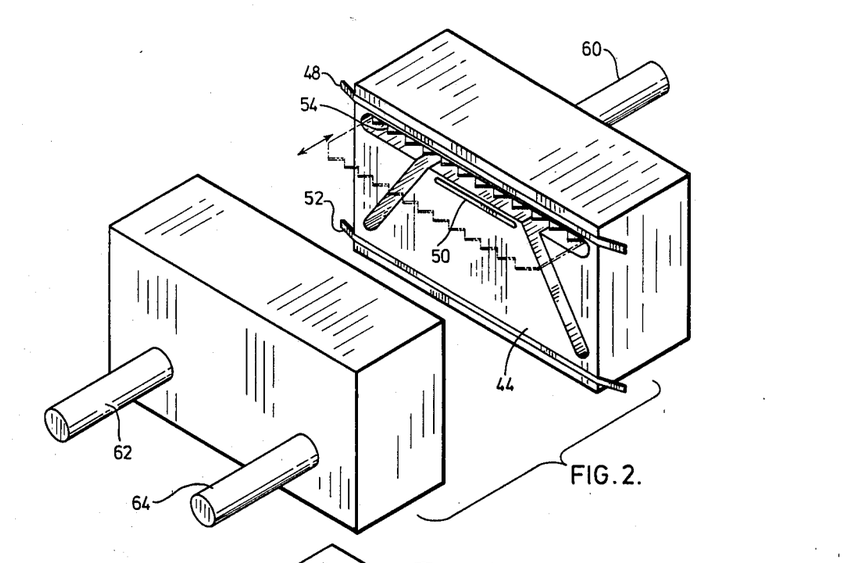
FIG. 2 is a perspective view showing the cutting and sealing jaws seen in FIG. 1.
Figure 3:
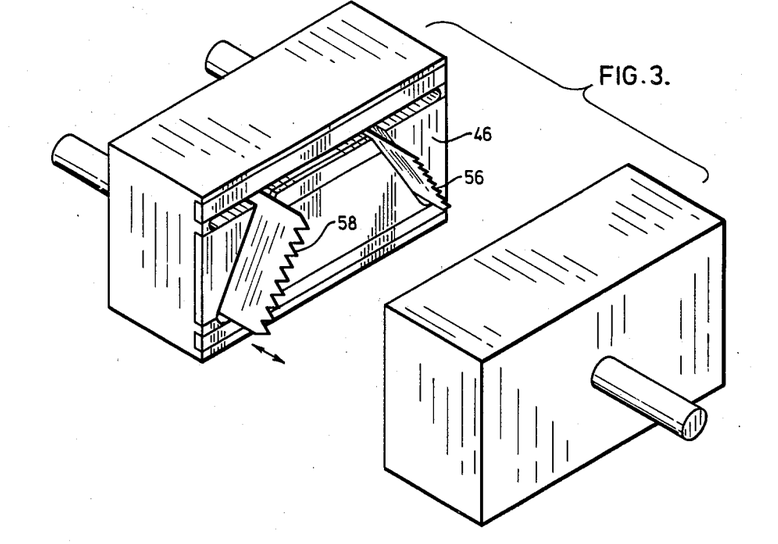
FIG. 3 is a perspective view showing these same jaws from another angle.
Figure 4:
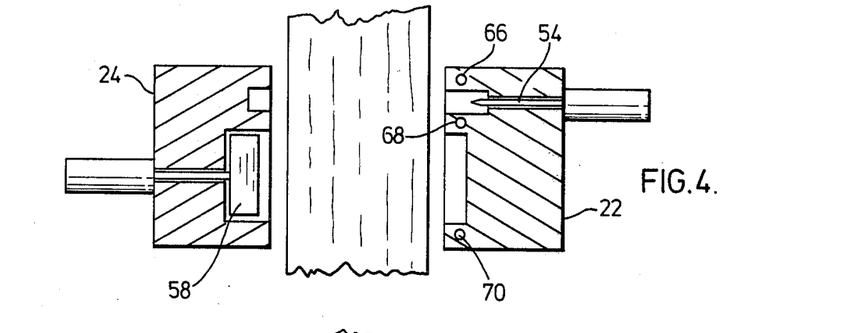
FIGS. 4 to 7 are schematic views illustrating the sequential operation of these cutting and sealing jaws.

Reference is first made to FIG. 1 which shows milk pouches 10 being packaged in groups of three according to a preferred embodiment of the invention. Flat roll stock low density polyethylene film 12 of approximately 2 mil thickness unrolls from film roll 14 and passes around film advance roller 16 before being formed into a generally tubular shape by forming shoulder 18. The opposite edges of a portion of the film are then joined by vertical seal bar 20 which utilizes an electrically heated wire to heat seal the film. The tubular portion of the film so formed then passes downwardly between cutting and sealing jaws 22, 24. The jaws 22, 24, shown in the closed position, are pneumatically reciprocated by cylinders 26, 28 and are supported by structure (not shown) to remain in alignment.

The previously collated milk pouches 10 arrive in groups of three on the conveyor 30 and are dropped downwardly through the forming shoulder 18 into the tubular portion 32 above the cutting and sealing jaws 22, 24. The cutting and sealing jaws 22, 24, operating as hereinafter described, seal the pouches 10 into packages 34 having a sealed enclosure portion 36 and an upper handle portion 38. Each package is supported below the cutting and sealing jaws 22, 24 by pivotal support member 40 until the jaws open, at which time the support member rotates to deposit the package on rollers 42. This process is repeated to form up to approximately thirty packages per minute, each package securely sealing three milk pouches and providing a convenient carrying handle.

The cutting and sealing jaws 22, 24 are in the closed position shown in FIG. 1 before each group of pouches are dropped from the conveyor 30 through the forming shoulder 18. The pouches 10 drop into the tubular portion 32 and come to rest upon the top of the closed jaws. At the same time, with the film held against movement by the closed jaws, the vertical seal bar 20 is pneumatically operated to join the edges of the film 12 to form another upwardly adjacent tubular portion. The vertical seal bar 20 is approximately 2 inches longer than the height of the packages 34, which provides an overlap of approximately 1 inch at each end of the vertical seal. As mentioned above, when the cutting and sealing jaws 22, 24 are opened, support member 40 is pivoted out of the way to allow the package 34 to drop onto rollers 42 which carry it away, and the support member 40 is then quickly returned to its horizontal position. At the same time, the weight of the pouches 10 in the tubular portion 32 of the film is no longer supported by the jaws and this draws the film downwardly between the open jaws until the pouches come to rest upon the support member 40 which by this time has returned to its horizontal position. The motion of the pouches is delayed by the friction of the film and the action of the film advance roller 16 and this gives the support member 40 sufficient time to return to its horizontal position before the pouch reaches that point. In this embodiment used for non-printed film, the spacing of the support member 40 from the jaws and the dimensions of the jaws themselves, of course, determine the height of the resulting package. When printed film is used, a photoelectric cell registration unit is used in conjunction with a set of film brakes located before the forming shoulder to provide a more precise package length, thus insuring proper printing location. This embodiment is discussed in connection with FIG. 10, hereinafter. The downward movement of the film positions another tubular portion 32 immediately above the jaws and draws more film over the forming shoulder 18 and then the jaws are closed and the process repeated. The operation of the vertical seal bar 20, the cutting and the sealing jaws 22, 24 and the pivotal support member 40, must be synchronized by operating means with the dropping of the pouches through the forming shoulder 18 which in turn is determined by the speed and dimensions of the conveyor 30 and the supply of collated pouches, up to the maximum speed of the system.

Referring now to FIGS. 2 to 7, the structure and operation of the cutting and sealing jaws 22, 24 will be described in more detail. As may be seen, portions of one of the faces 44, 46 of the jaws are covered by silicon rubber, while the face of the other jaw has lateral or horizontal sealing wires 48, 50, 52 extending across it. The silicon rubber acts in conjunction with raised metal portions (not shown) on the opposite jaw to firmly grip the film as well as back-up rubber for the sealing wires. The faces of the jaws are also interrupted by slots for lateral cut-off knife 54 and diagonal cut-off knives 56, 58, which are respectively pneumatically operated by cylinders 60, 62, 64. Cooling water circulates through cooling coils 66, 68, 70 respectively located adjacent the lateral sealing wires.

Figure 5:
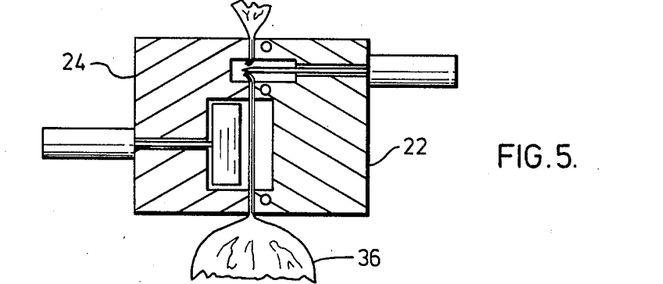
Figure 6:
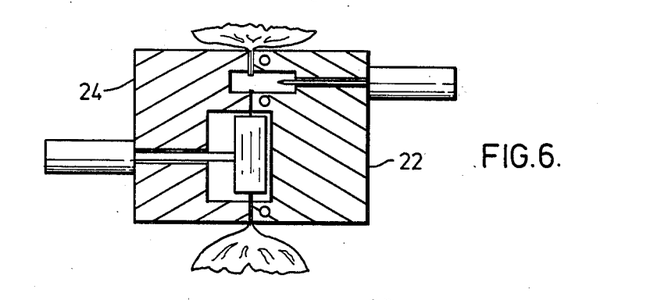
Figure 7:
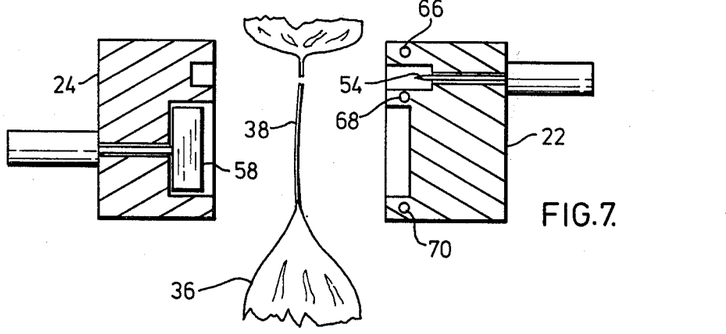

In describing the operation of the cutting and sealing jaws 22, 24, reference is made to sequential FIGS. 4 to 7. As described above, when the jaws are opened, the pouches 10 which have been supported on them draw the tubular portion 32 of the film downward between the jaws until the pouches come to rest on support member 40. Then the jaws are closed by cylinders 26, 28 and an impulse of electric current is passed through the lateral sealing wires 48, 50, 52 to melt the adjacent film. Cooling is then provided by cooling coils 66, 68, 70 before the jaws are opened and this securely seals the front and back sides of the package together along three lateral or horizontal seal lines extending in a common plane. At the same time as the heating and cooling is carried out, the two sides of the package are cut by the cut-off knives operating in sequence. As seen in FIG. 5, lateral cut-off knife 54 is operated by cylinder 60 to cut both sides of the film across their entire width just above sealing wire 50 and thus separate the package from the remainder of the film. The lateral cut-off knife 54 is then retracted and the diagonal cut-off knives 56, 58 mounted in the other jaw are operated by cylinders 62, 64 to cut the film along two diagonally opposed cut lines to clip the corners of the package. The knives have serrated edges to facilitate cutting and, as may be seen, they pass approximately ¼ inch through the film to insure complete separation. As may be seen, the upper lateral sealing wire 48 forms a join along a lower lateral seal line for the next package, while the other two sealing wires 50, 52 form seal lines for the previously filled package. The jaws are then opened and the package drops downwardly as described above.

Figure 8:
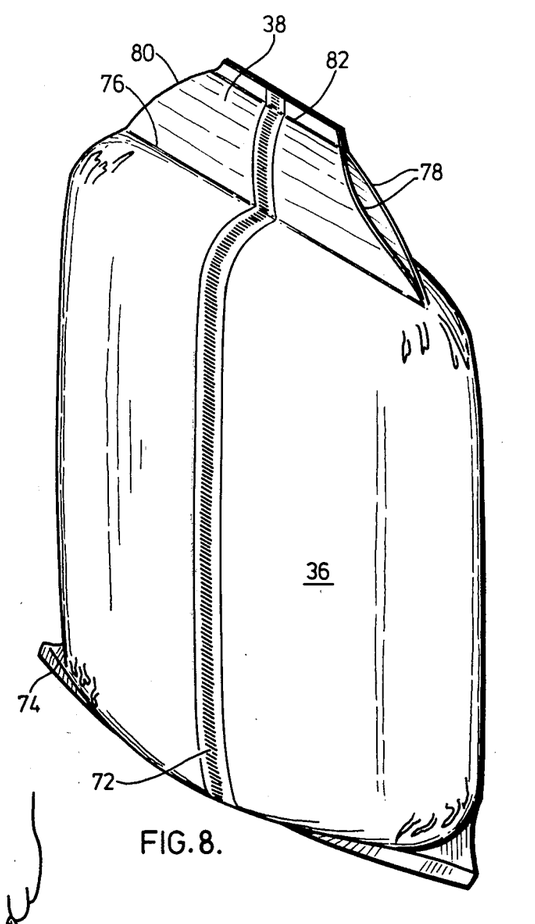
FIG. 8 is a perspective view of a package according to a preferred embodiment of the invention.
Figure 9:
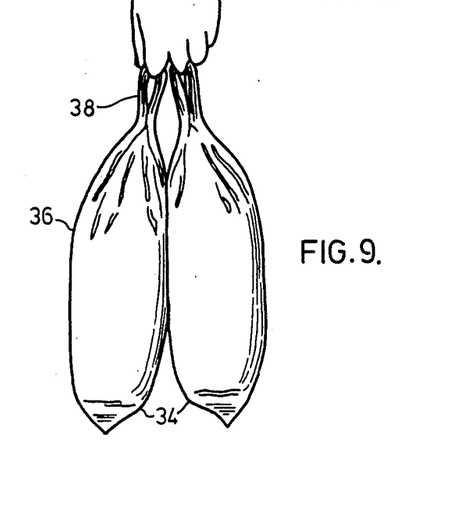
FIG. 9 is a perspective view showing two of the packages being carried.

Packages 34 as formed by this method according to a preferred embodiment of the invention are shown in FIGS. 8 and 9. As may be seen, each package 34 has a sealed enclosure portion 36, and an upper handle portion 38. The package is formed of a single piece of film with a vertical seal line 72 formed by the vertical seal bar 20 extending from top to bottom. A lower lateral seal line line 74 formed by sealing wire 48 extends right across the package, as does intermediate lateral seal line 76 to define the enclosure portion containing the milk pouches therebetween. The upper corners of the package have been clipped by the diagonal cut-off knives 56, 58 along opposed diagonal cut lines 78, 80, which in this embodiment extend at approximately 40° to horizontal. Upper lateral seal line 82 extends across between the diagonal cut lines 78, 80 and is spaced sufficiently from the intermediate seal line 76 to form the handle portion 38 of sufficient size to laterally insert two or three fingers into it. As may be seen in FIG. 9, more than one package may be conveniently carried in one hand by inserting the fingers through the handle portions of the packages. It has been found that this structure distributes the stress across the handle portion enabling relatively lightweight film to be used which results in a substantial savings in film costs.

In another embodiment of the invention (not shown) cut-off knives 56, 58 may not be provided to clip the upper corners of the package along diagonal cut lines 78, 80. In this instance, seal line 82 formed by sealing wire 50 extends across only the central portion of the package and the package is lifted and carried by inserting the fingers down around one end of the seal line 82 and then through the handle portion 38 beneath the seal line.

Figure 10:
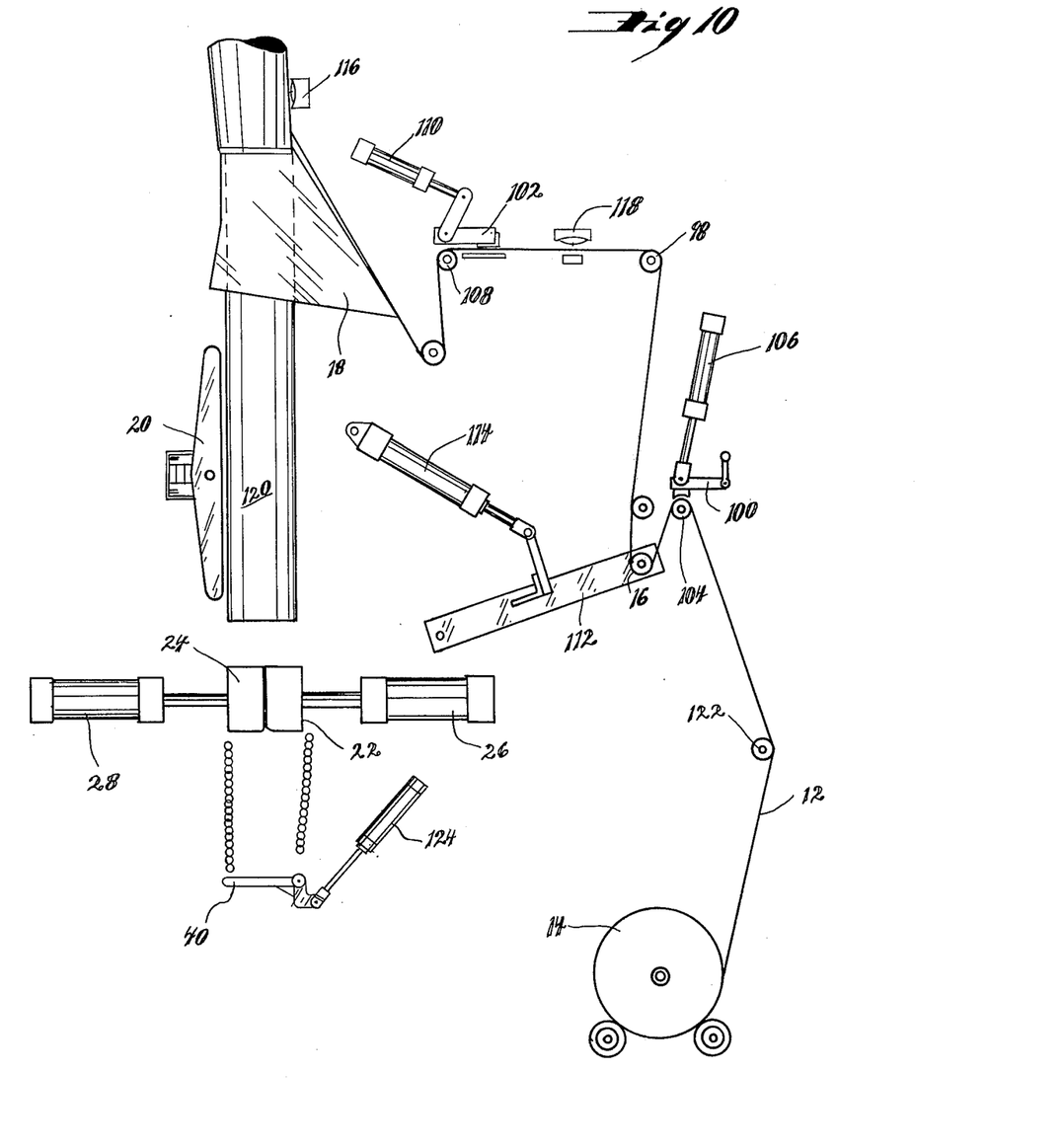
FIG. 10 is a schematic view of a packaging system similar to FIG. 1, but providing further embodiments.

FIG. 10 shows a further embodiment of the invention, as described hereinbefore, wherein a system of brakes are used for control of the advancing film. The apparatus of this figure is essentially the same as that shown in FIG. 1 where like elements have the same numbers. The operation of the apparatus is also essentially the same as that described in connection with FIG. 1, with the exception of the brake system for controlling the advance of the film, as described hereinafter. Thus, film 12 is unrolled from film roll 14, passed around advancing roller 16, and over forming shoulder 18, where the film is configured into a tube and sealed by vertical seal bar 20. The film, in the manner described in connection with FIG. 1, advances between jaws 22 and 24 which are actuated by reciprocating cyclinders 26 and 28 and the sealed packages are ultimately discharged from pivotal support member 40. All of the foregoing operates in the manner described in connection with FIG. 1.

However, in this embodiment, the film delivery system has two brake members, i.e. a back brake member 100 and a front brake member 102. Back brake member 100 cooperates with brake roller 104 and air cylinder 106, while front brake member 102 cooperates with brake roller 108 and air cylinder 110. Advancing roller 16 is carried by dancer bar 112 which is controlled by air cylinder 114. The actuation of brakes 100 and 102 is controlled by filling tube photoelectric cell 116 and register photoelectric cell 118.

Operation of this embodiment is as follows:

When jaws 22 and 24 are in the closed position (as shown in FIG. 10), vertical seal bar 20 is also in the closed position, that is pressed against filling tube 120. Product, i.e. pouches 10 (not shown in FIG. 10) drop through filling tube 120 and come to rest on the top of jaws 22 and 24, as previously described in connection with FIG. 1. As the product passes through filling tube 120, it causes actuation of filling tube photoelectric cell 116, which by electrical means, well known to the art, causes vertical seal bar 20 to retract, air cylinder 114 to actuate and lift dancer bar 112, and air cylinder 110 to retract and release front brake member 102. After a preset time delay, jaws 22 and 24 are opened and film 12, due to the weight of the product (as explained hereinbefore), is advanced passed guide roller 122 and, ultimately, over forming shoulder 18. Also similarly to that explained above, at the same time that jaws 22 and 24 are opened, pivotal support member 40 is released by air cylinder 124, i.e. pivotally swung away whereby a package 34 (not shown in FIG. 10) is also released, as explained in connection with FIG. 1.

Thus, as explained in connection with FIG. 1, when the proper distance between the pivotal support member 40 and jaws 22 and 24 has been set, a further package for sealing will advance sufficiently through jaws 22 and 24, before closing, and pivotal support member 40 will swing back into the closed position by action of air cylinder 124 for supporting that yet unsealed package.

This embodiment allows the use of film which has printing thereon and, correspondingly, requires coordination between the place of sealing and the printing on the film, such that sealing does not take place across the printing. This is achieved by register photoelectric cell 118. A registration mark indicia is placed on film 12 so that the film passing register photoelectric cell 118 can be indexed at that point. Photoelectric cell 118 is movable in a plane parallel with the film so that adjustment of the photoelectric cell in connection with the registration mark is achievable. Thus, the film path distance between register photoelectric cell 118 and pivotal support member 40 is some whole number of packages. For example, that film length may be 5 completed package lengths. As will therefore be appreciated, each time register photoelectric cell 118 senses a register mark, the film will have passed through the apparatus a distance of one whole package length. Accordingly, the registration mark repeat length is determined in conjunction with the distance from the pivotal support member 40 to the jaws 22 and 24. In addition, some adjustment may be required in register photoelectric cell 118 to allow for brake reaction time, as explained more fully hereinafter.

With the register photoelectric cell 118 preset in the correct position, that photoelectric cell actuates air cylinder 110 to close front brake 102 just as the advancing film with a pouch therein engages closing pivotal support member 40. Front brake member 102 remains engaged for a preselected time duration, and then released as jaws 22 and 24 are closing. This is to insure minimum film tension at vertical sealing bar 20 and horizontal sealing jaws 22 and 24. After jaws 22 and 24 are closed, front brake member 102 is again closed by actuation of air cylinder 110, back brake member 100 is in the open position, and air cylinder 114 is actuated to move downwardly dancer ball 112, which causes an unwinding of film 12 from roll 14 along guide roll 122. Of course, front brake member 102, being in the closed position, prevents film from being pulled back through the apparatus as dancer bar 112 is moved in the downward position to withdraw additional film 12 from roll 14. It is necessary to avoid any retraction of film through the apparatus, since this would not only put stress on the film when sealing is taking place, but would move the film back out of register with the register photoelectric cell 118.

After film 12 has been withdrawn from roll 14 by the downward movement of dancer bar 112, back brake member 100 is actuated by air cylinder 106 to close that brake, so that when dancer bar 112 is retracted (moved to the upper position) the weight of film between brake roller 104 and film roll 14 will not cause film played out by dancer bar 112 to be retracted back toward film roll 14. It should also be understood that dancer bar 112 will advance more film from roll 14 during its downward movement than required for one package length. This is permissable, since in this embodiment, the measuring of a package length is achieved when the advancing tubular portion 32 (see FIG. 1) engages pivotal support member 40 and front brake member 102 is closed in operation by register photoelectric cell 118, as explained above.

Thus, in overall operation of this embodiment, pouches 10 (not shown in FIG. 10) actuates tube filling photoelectric cell 116 as it passes through filling tube 120 and actuation of that photoelectric cell causes vertical jaw 20 to be opened and dancer bar 112 to be lifted, along with back brake member 100 being closed. The pouches are deposited within the sealed tubular member 32 (see FIG. 1) and rest upon closed jaws 22 and 24. Jaws 22 and 24 are then opened and vertical support member 40 is pivoted downwardly. The weight of the pouches in tubular portion 32 advances film 12 over forming shoulder 18 and downwardly over filling tube 120. A previously sealed package (34 in FIG. 1) drops from pivotal support member 40 and thereafter pivotal support member 40 again closes. At the same time tubular portion 32 advances through opened jaws 24 and 22 and comes to rest on pivotal support member 40 as another package 34 (see FIG. 1). At that same time, front brake member 102 is closed by cell 118 for a preset time and then released. Jaws 22 and 24 are closed and sealing of the package commences. Vertical seal bar 20 is actuated and seals a further tubular portion. While jaws 22 and 24 are closed and sealing is taking place, front brake member 102 is again closed and dancer bar 112 is moved downwardly while back brake member 100 is in the opened position. After dancer bar 112 has moved to its most downward position, back brake member 100 is closed, dancer bar 112 is moved upwardly, and the cycle is repeated.

It will be appreciated that while the foregoing disclosure describes the specific embodiment of FIG. 10, known equivalence of the specific elements described in that embodiment may be used. Thus, in lieu of photoelectric cells any sensing means for sensing the register mark (indicia) on the film may be used. Likewise, any sensing means for sensing the passage of material through the filling tube, e.g. pouches, may be used, as opposed to only photoelectric cells. These devices are well known in the art and include, inter alia, feeler finger operated micro switches, optically operated sensing means and electronic sensing means. Likewise, the indicia sensing means may be other than a photoelectric cell and also include known devices such as optically actuated sensing means, magnetic operated sensing means, color operated sensing means and the like.

While not necessary for all applications of the present method and apparatus, for some packaging operations it is desirable that support member 40 be slightly delayed in returning to the closed position, as explained above. Thus the package with material therein will advance through open jaws 24 and 22 slightly more than the distance between the jaws and the support member. When the support member, after the slight delay, reaches the fully closed position, it causes the package to slightly flex, vertically, between the closed support member and the closing jaws. This allows additional film to be provided in the area to be heat sealed and more easily accommodates bulky material being packaged by virtue of the extra film being supplied.

Although the description of this invention has been given with respect to only preferred embodiments of the method and the package, it is not to be construed in a limiting sense. Many variations and modifications will now occur to those skilled in the art. More specifically, it will be apparent that this method may be used to package a variety of materials and goods in addition to milk pouches and that different types and weights of film will be used for different applications. It will also be apparent that different methods of sealing may be used to join the film. For a definition of the invention, reference is made to the appended claims.

We claim:

1. A method for automatically repeatedly packaging material in a flexible film package made from a continuous stock of film, said package having a substantially vertical heat seal joining the edges of the film into a tubular portion, a lower lateral heat seal, an upper lateral heat seal and the material being disposed in the so sealed package, comprising:

(1) advancing the film downwardly to form a tubular configuration thereof over a forming means;

(2) heat sealing opposite edges of the film along a substantially vertical seal line to form a sealed tubular portion thereof;

(3) closing sealing jaws transversely to engage thereinbetween the tubular portion disposed downwardly of the forming means;

(4) heat sealing opposite sides of the tubular portion by sealing means disposed with said jaws to form said lower lateral seal line in said tubular portion and said upper lateral seal line in a previous filled package located below said jaws and supported by a support member disposed downwardly from said jaws;

(5) laterally cutting the so sealed tubular portion between the upper and lower seal lines to separate said filled package from said tubular portion;

(6) depositing said material into the tubular portion disposed upwardly of the said jaws, while said jaws are closed, whereby the material is supported above and by said closed jaws;

(7) substantially simultaneously opening said jaws to release said tubular portion disposed upwardly of said jaws and opening said support member to allow said filled package resting upon the support member to fall therefrom, whereby the weight of the material alone disposed in the tubular portion above the jaws advances the tubular portion by gravity through said opened jaws, whereby step (1) is automatically repeated;

(8) closing said support member whereby the material and the tubular portion that passed through said open jaws comes to rest upon the closed support member and the advance of the tubular portion is stopped, and whereby the correct length of tubular portion for forming a package is automatically measured by the distance of the support member from the jaws; and (9) repeating the steps for repeated packaging of the material, and wherein after step (3) the steps (4) through (6) may be in any order.

2. The method of claim 1 wherein the said film has spaced apart printing and register indicia thereon, which indicia are sensible by an indicia sensing means, film is passed near the indicia sensing means and the indicia causes the indicia sensing means to actuate and close a brake member on the advancing film, whereby the advancing film is stopped and said sealing takes place between the said printings on the film.

3. The method of claim 1 wherein a material sensing means, sensitive to said material to be packaged, is disposed in the path of the said material at a position prior to its being deposited into said tubular portion, the said material is passed near the said material sensing means and the material sensing means, after a time delay, actuates the opening of said jaws and a repeat of the said steps.

4. The method of claim 1 wherein the said film has spaced apart printing and register indicia thereon, which indicia are sensible by an indicia sensing means, film is passed near the indicia sensing means and the indicia causes the indicia sensing means to actuate and close a brake member on the advancing film, whereby the advancing film is stopped and said sealing takes place between the said printings on the film, and wherein a material sensing means, sensitive to said material to be packaged, is disposed in the path of the said material at a position prior to its being deposited into said tubular portion, the said material is passed near the said material sensing means and the material sensing means, after a time delay, actuates the opening of said jaws and a repeat of the said steps.

5. An apparatus for automatically repeatedly packaging material in a flexible film package made from a continuous stock of film, said package having a substantially vertical heat seal joining the edges of the film into a tubular portion, a lower lateral heat seal, an upper lateral heat seal and the material being disposed in the so sealed package, comprising:

(1) a forming means for forming a tubular configuration of the film as the film is advanced thereover;

(2) vertical heat sealing means disposed downwardly from the forming means for heat sealing opposite edges of the tubularly configured film along a substantially vertical seal line to form a sealed tubular portion thereof;

(3) transverse sealing jaws disposed downwardly from the vertical heat sealing means and having means for closing said jaws and for engaging thereinbetween the sealed tubular portion disposed downwardly of the forming means;

(4) lateral heat sealing means disposed with said jaws for heat sealing opposite sides of the tubular portion to form said lower lateral seal line in said tubular portion and said upper lateral seal line in a previous filled package located below said jaws;

(5) a support member disposed downwardly from said jaws for supporting said previous filled package;

(6) laterally cutting means for laterally cutting the sealed tubular portion between the upper and lower seal lines to separate said filled package from said tubular portion;

(7) depositing means for depositing said material into the tubular portion disposed upwardly of the said jaws, while said jaws are in a closed position, whereby the deposited material is supported above and by said closed jaws;

(8) operating means for substantially simultaneously opening said jaws to release said tubular portion disposed upwardly of said jaws and for opening said support member to allow said filled package resting upon the support member to fall therefrom, whereby the weight of the material alone disposed in the tubular portion above the jaws is capable of advancing the tubular portion by gravity through said opened jaws, and the function of the said forming means is automatically repeated, and for closing said support member so that the material and the tubular portion that passed through said opened jaws may come to rest upon the closed support member and the advance of the tubular portion is capable of being stopped, whereby the correct length of tubular portion for forming a package is automatically measured by the distance of the support member from the jaws; and (9) repetitive operating means for repeating all of the said functions.

6. The apparatus of claim 5 wherein the film to be used by the apparatus has spaced apart printing and register indicia thereon, and an indicia sensitive sensing means disposed priorly to said forming means, a brake member cooperatively disposed near said film and brake operating means are provided so that said indicia sensing means is actuatable by said indicia to operate and close said brake member on the advancing film, whereby the advancing film is capable of being stopped and said sealing function may take place between said printing on said film.

7. The apparatus of claim 5 wherein a material sensing means disposed in the path of said material as it is being deposited in said tubular portion and jaws actuating means, responsive to said material sensing means, are provided for sensing the said material being deposited in the tubular portion and for opening the said jaws, after a time delay, and for causing a repeat of all of the functions of elements 1 through 7.

8. The apparatus of claim 5 wherein the film to be used by the apparatus has spaced apart printing and register indicia thereon, and an indicia sensitive sensing means disposed priorly to said forming means, a brake member cooperatively disposed near said film and brake operating means are provided so that said indicia sensing means is actuatable by said indicia to operate and close said brake member on the advancing film, whereby the advancing film is capable of being stopped and said sealing function may take place between said printing on said film, and wherein a material sensing means disposed in the path of said material as it is being deposited in said tubular portion and jaws actuating means, responsive to said material sensing means, are provided for sensing the said material being deposited in the tubular portion and for opening the said jaws, after a time delay, and for causing a repeat of all of the functions of elements 1 through 7.

* * * * *